(12) United States Patent
Mitra et al.

(10) Patent No.: US 9,039,900 B2
(45) Date of Patent: May 26, 2015

(54) MEMBRANE DISTILLATION APPARATUS AND METHODS

(75) Inventors: Somenath Mitra, Bridgewater, NJ (US); Ken Gethard, Fairfield, NJ (US)

(73) Assignee: New Jersey Institute of Technology, Newark, NJ (US)

(*) Notice: Subject to any disclaimer, the term of this patent is extended or adjusted under 35 U.S.C. 154(b) by 90 days.

(21) Appl. No.: 13/085,854

(22) Filed: Apr. 13, 2011

(65) Prior Publication Data

US 2011/0272354 A1 Nov. 10, 2011
US 2015/0001150 A9 Jan. 1, 2015

Related U.S. Application Data

(63) Continuation of application No. 12/437,789, filed on May 8, 2009.

(60) Provisional application No. 61/323,860, filed on Apr. 13, 2010, provisional application No. 61/051,877, filed on May 9, 2008.

(51) Int. Cl.
*B01D 15/00* (2006.01)
*C02F 1/44* (2006.01)
*B01D 63/00* (2006.01)
*B01D 39/00* (2006.01)
*B01D 3/10* (2006.01)
(Continued)

(52) U.S. Cl.
CPC .............. *B01D 61/364* (2013.01); *B01D 61/02* (2013.01); *B01D 67/0079* (2013.01); *B01D 69/06* (2013.01); *B01D 69/08* (2013.01); *B01D 69/148* (2013.01); *B01D 71/021* (2013.01); *B01D 71/34* (2013.01); *B01D 2311/13* (2013.01); *B01D 2313/38* (2013.01); *B01D 2325/38* (2013.01); *B82Y 30/00* (2013.01); *C02F 1/04* (2013.01); *C02F 1/447* (2013.01); *C02F 2305/08* (2013.01)

(58) Field of Classification Search
CPC ............ B01D 61/364; B01D 63/02; B01D 2311/103; B01D 61/36; C02F 1/447; C02F 9/00; C02F 2103/08; C02F 1/04
USPC ............. 210/640, 502.1, 500.38, 500.41, 210/500.42, 321.8, 500.23, 257.2, 321.6, 210/175, 180; 95/52; 96/4; 202/81, 152; 203/10–12, 14
See application file for complete search history.

(56) References Cited

U.S. PATENT DOCUMENTS 3,340,186 A 9/1967 Weyl
3,406,096 A 10/1968 Rodgers
(Continued)

OTHER PUBLICATIONS

Fubing Peng et al., Journal of Membrane Science, vol. 300 Issues 1-2, Aug. 15, 2007, pp. 13-19.*

(Continued)

*Primary Examiner* — Ana Fortuna
(74) *Attorney, Agent, or Firm* — Timothy X. Gibson, Esq.; Gibson & Dernier LLP

(57) ABSTRACT

Membranes for membrane distillation include at least one hollow fiber porous hydrophobic membrane, the at least one membrane including carbon nanotubes incorporated into the pore structure of the membrane. Membrane distillation systems may include a heat exchanger operably connected to a hollow fiber membrane module with one or more membranes including carbon nanotubes. Methods of solvent removal, sample preconcentration and desalination employing hollow fiber porous hydrophobic membranes with carbon nanotubes are disclosed.

26 Claims, 12 Drawing Sheets

(51) Int. Cl.
| | |
|---|---|
| B01D 61/36 | (2006.01) |
| B01D 61/02 | (2006.01) |
| B01D 67/00 | (2006.01) |
| B01D 69/06 | (2006.01) |
| B01D 69/08 | (2006.01) |
| B01D 69/14 | (2006.01) |
| B01D 71/02 | (2006.01) |
| C02F 1/04 | (2006.01) |
| B01D 71/34 | (2006.01) |
| B82Y 30/00 | (2011.01) |

(56) References Cited

U.S. PATENT DOCUMENTS

| | | | |
|---|---|---|---|
| 3,650,905 | A | 3/1972 | Rodgers |
| 4,419,187 | A | 12/1983 | Cheng |
| 4,460,473 | A | 7/1984 | Curtin |
| 5,102,550 | A * | 4/1992 | Pizzino et al. .............. 210/640 |
| 6,716,355 | B1 | 4/2004 | Hanemaaijer et al. |
| 7,211,320 | B1 * | 5/2007 | Cooper et ................ 428/306.6 |
| 7,323,033 | B2 * | 1/2008 | Kroupenkine et al. .......... 95/45 |
| 7,361,276 | B2 | 4/2008 | Twardowski |
| 7,365,100 | B2 * | 4/2008 | Kuper et al. .................. 516/32 |
| 7,459,084 | B2 * | 12/2008 | Baig et al. .................... 210/640 |
| 7,608,185 | B2 * | 10/2009 | Liao et al. .................. 210/321.8 |
| 7,708,810 | B2 * | 5/2010 | Foley et al. ........................ 96/4 |
| 7,754,054 | B2 * | 7/2010 | Mitra et al. .............. 204/157.15 |
| 7,837,877 | B2 * | 11/2010 | Cao et al. ..................... 210/640 |
| 7,871,520 | B2 * | 1/2011 | Ma et al. ...................... 210/640 |
| 7,931,838 | B2 * | 4/2011 | Marand et al. ............... 264/101 |
| 7,993,524 | B2 * | 8/2011 | Ratto et al. ................... 210/652 |
| 8,029,857 | B2 * | 10/2011 | Hoek et al. ................... 427/245 |
| 8,038,887 | B2 * | 10/2011 | Bakajin et al. ............... 210/652 |
| 8,177,978 | B2 * | 5/2012 | Kurth et al. .................. 210/652 |
| 8,196,756 | B2 * | 6/2012 | Ratto et al. ............... 210/500.41 |
| 8,286,803 | B2 * | 10/2012 | Nowak et al. ................ 210/490 |
| 2008/0216649 | A1 * | 9/2008 | Huang et al. ..................... 95/50 |
| 2009/0000939 | A1 | 1/2009 | Heinzl |
| 2009/0283475 | A1 * | 11/2009 | Hylton et al. ................ 210/644 |
| 2010/0051549 | A1 * | 3/2010 | Ma et al. ...................... 210/640 |
| 2011/0180479 | A1 * | 7/2011 | Cordatos et al. ............. 210/640 |
| 2011/0253630 | A1 * | 10/2011 | Bakajin et al. ............... 210/651 |
| 2011/0259822 | A1 * | 10/2011 | Al-Jlil .......................... 210/615 |
| 2011/0272354 | A1 * | 11/2011 | Mitra et al. .................. 210/640 |
| 2012/0061319 | A1 * | 3/2012 | Vandezande et al. ........ 210/640 |

OTHER PUBLICATIONS

Edmund J. Bishop, et al. "Measurement of nitrophenols in air samples by impinger sampling and supported liquid membrane micro-extraction" Elsevier B.V., Analytica Chimica Acta, vol. 583 pp. 10-14 (2007).

Xiaoyan Wang, et al., "Continuous, on-line monitoring of haloacetic acids via membrane extraction" Elsevier B.V., Journal of Chromatography A, 1089 pp. 39-44 (2005).

Xiaoyan Wang, et al., "Development of a total analytical system by interfacing membrane extraction, pervaporation and high-performance liquid chromatography" Elsevier B.V., Journal of Chromatography A, 1068, pp. 237-242 (2005).

Kamilah Hylton, et al., "Automated, on-line membrane extraction" Elsevier B.V., Journal of Chromatography A, 1152, pp. 199-214 (2007).

Kamilah Hylton, et al., "Microscale membrane extraction of diverse antibiotics from water" Elsevier B.V., Analytica Chimica Acta, vol. 653, pp. 116-120 (2009).

Xiaoyan Wang, et al., "Enhancing micro-scale membrane extraction by implementing a barrier film" Elsevier B.V., Journal of Chromatography A, 1122, pp. 1-6 (2006).

Kamilah Hylton, et al. "A microfluidic hollow fiber membrane extractor for arsenic(V) detection" Elsevier B.V., Analytica Chimica Acta, vol. 607, pp. 45-49 (2008).

Dawen Kou, et al., "Supported liquid membrane microextraction with high-performance liquid chromatography—UV detection for monitoring trace haloacetic acids in water" Elsevier B.V., Journal of Chromatography A, 1055, pp. 6369 (2004).

Dawen Kou, et al., "Simultaneous Extraction and Concentration by On-Line Hollow Fiber Membrane Extraction" American Chemical Society, Analytical Chemistry, vol. 75, No. 22, pp. 6355-6360 (Nov. 15, 2003).

Ping Peng, et al., Desalination by Membrane distillation adopting a hydrophilic membrane Elsevier B.V., Desalination 173, pp. 45-54 (2005).

David Wirth, et al., "Water desalination using membrane distillation: comparison between inside/out and outside/in permeation" Elsevier B.V., Desalination 147, pp. 139-145, (2002).

F. Banat, et al., "Exploitation of solar energy collected by solar stills for desalination by membrane distillation" Elsevier Science Ltd, Renewable Energy 25 pp. 293-305 (2002).

John Walton, et al., "Solar and Waste Heat Desalination by Membrane Distillation" College of Engineering, University of Texas at El Paso, Desalination and Water Purification Research and Development Program Report No. 81, Agreement No. 98-FC-81-0048, 50 pages (Apr. 2004).

Lindsey R. Evans, et al., "Sweeping Gas Membrane Desalination Using Commercial Hydrophobic Hollow Fiber Membranes" Sandia National Laboratories, SAND REPORT, SAND 2002-0138, 34 pages (Jan. 2002).

Baoan Li, et al. "Novel membrane and device for vacuum membrane distillation-based desalination process" Elsevier B.V., Journal of Membrane Science 257, pp. 60-75 (2005).

Tzahi Y. Cath, et al., "Experimental study of desalination using direct contact membrane distillation: a new approach to flux enhancement" Elsevier B.V., Journal of Membrane Science 228, pp. 5-16 (2004).

Corinne Cabassud, et al., Membrane distillation for water desalination: how to chose an appropriate membrane? Elsevier Science B.V., Desalination 157 pp. 307-314 (2003).

M. Khayet, et al. "Theoretical and experimental studies on desalination using the sweeping gas membrane distillation method" Elsevier Science B.V., Desalination 157, pp. 297-305 (2003).

Sergey Gunko, et al., "Concentration of apple juice using direct contact membrane distillation" Elsevier B.V., Desalination 190, pp. 117-124 (2006).

A. Cassano, et al., "Clarification and concentration of citrus and carrot juices by integrated membrane processes" Elsevier Science Ltd., Journal of Food Engineering 57, pp. 153-163 (2003).

V. Soni, et al., "Modeling and analysis of vacuum membrane distillation for the recovery of volatile aroma compounds from black currant juice" Elsevier B.V., Journal of Membrane Science 320, pp. 442-455 (2008).

Áron Kozák, et al., "Integrated large-scale membrane process for producing concentrated fruit juices" Elsevier B.V., Desalination 200, pp. 540-542 (2006).

Sanjay Nene, et al., "Membrane distillation for the concentration of raw cane-sugar syrup and membrane clarified sugarcane juice" Elsevier Science B.V., Desalination 147, pp. 157-160 (2002).

A. Marin, et al., "Validation of a HPLC quantification of acetaminophen, phenylephrine and chlorpheniramine in pharmaceutical formulations: capsules and sachets" Elsevier Science B.V., Journal of Pharmaceutical and Biomedical Analysis 29, pp. 701-714 (2002).

S. Al-Asheh, et al., "Concentration of sucrose solutions via vacuum membrane distillation" Elsevier B.V., Desalination 195 pp. 60-68 (2006).

Sulaiman Al-Obaidani, et al., "Potential of membrane distillation in seawater desalination: Thermal efficiency, sensitivity study and cost estimation" Elsevier B.V., Journal of Membrane Science 323, pp. 85-98, (2008).

Edmund J. Bishop, et al., "Hollow fiber membrane concentrator for on-line preconcentration" Elsevier B.V., Journal of Chromatography A, 1046, pp. 11-17 (2004).

B. Ravindra Babu, et al., "Liquid-liquid extraction of bromelain and polyphenol oxidase using aqueous two-phase system" Elsevier B.V., Chemical Engineering and Processing 47, pp. 83-89 (2008).

(56) References Cited

OTHER PUBLICATIONS

Chul Haeng Lee, et al., "Effect of operating variables on the flux and selectivity in sweep gas membrane distillation for dilute aqueous isopropanol" Elsevier B.V., Journal of Membrane Science 188, pp. 79-86 (2001).

Zongli Xie, et al., "Ammonia removal by sweep gas membrane distillation" Elsevier B.V., Water Research 43, pp. 1693-1699 (2009).

Kamilah Hylton, et al., "Carbon nanotube mediated microscale membrane extraction", Journal of Chromatography A 1211, pp. 43-48, 2008.

* cited by examiner

MEMBRANE DISTILLATION APPARATUS AND METHODS

CROSS-REFERENCE TO RELATED APPLICATION(S)

This application claims the benefit of U.S. Provisional Patent Application No. 61/323,860 filed Apr. 13, 2010, the entirety of which is incorporated herein by reference.

FIELD OF THE INVENTION

The present invention relates to membrane distillation and in particular to carbon nanotube enhanced membrane distillation apparatus and methods.

BACKGROUND

There has been significant interest in using membranes separation for both industrial scale processes and the preparation of analytical samples. In part, this is due to the fact that membranes facilitate extraction and separation without allowing the mixing of two phases. Membrane distillation (MD) is a low temperature (60-90° C.) distillation process that has been used in diverse applications ranging from water desalination to concentration of fruit juice and sucrose. Conventional distillation relies strictly on thermal vaporization, whereas in MD the water vapors are selectively transmitted through a microporous membrane. The heated solution is passed through the lumen of a hydrophobic hollow fiber which prevents passage of the liquid phase. However, the hot solution has a high vapor pressure and MD relies on the net flux of water vapor from the warm side of the membrane to the cool side. The driving force for the vapor transport is determined by the vapor pressure difference across the membrane, which depends upon the temperature differences. Analytical applications of membrane extraction have relied on the selective permeation of the analyte, and this is a challenge because selective membranes for diverse analytes are not always available.

Carbon nanotubes (CNTs) have been used in a variety of applications related to separations and concentration of trace impurities. Various studies have shown that both liquid and gas permeability through CNTs far exceed what is expected from traditional diffusion techniques. Use of nanoparticles with polymeric membrane materials have also been shown to have enhanced separation in assorted liquid and gaseous systems.

To date, however, CNTs have not been employed in connection with membrane distillation techniques.

SUMMARY OF THE INVENTION

The present inventors have found that incorporating CNTs into the structure of a hollow fiber polymeric membrane provides unexpectedly enhanced membrane distillation (MD). This is applicable to a wide range of membranes that may be flat, porous, nonporous, composite, hydrophilic or hydrophobic. Other forms of nano carbons can also be substituted for carbon nanotubes. The membranes can be used in the different forms of membrane distillation including Vacuum Gap MD, Direct Contact MD, Airgap MD and Sweep Gas MD.

In accordance with a first embodiment an improved membrane for membrane distillation is provided wherein nano carbons such as carbon nanotubes (CNTs) are incorporated into the structure of a membrane such as a hollow fiber porous hydrophobic membrane. Recent work has shown CNTs to have excellent sorbent properties as well as desirable mechanical and electrical properties. Popov, V. *Mater. Sci. Eng.*, R, 2004, 43, 61; Baena, J. R et al., *Anal. Chem,* 2002, 125, 1495. CNTs also increase functional surface area in the membrane system due to their high aspect ratio Li, J.; Ma, P. C.; Chow, W. S.; To, C. K.; Tang, B. Z.; Kim, J. K. *Advanced Functional Materials,* 2007, 17, 16. Since CNTs are nonporous they also exhibit quick desorption. The present inventors have found that incorporating nano carbons such as CNTs into membranes provides alternate transport mechanisms for enhanced separation. The CNTs can act as both molecular transporters and sorbents thereby increasing the permeability of a substance through a membrane as well as increasing the selectivity. Further, CNTs can increase the rate of mass transfer at the liquid membrane pore interface by allowing rapid solute exchange on the CNTs themselves.

In one embodiment a membrane is provided wherein at least a portion of the carbon nanotubes comprise multiwalled carbon nanotubes.

In another embodiment a membrane module is provided having a housing containing therein at least one membrane having nano carbons such as CNTs incorporated into the structure of a membrane such as a hollow fiber porous hydrophobic membrane, the module operable to receive a feed and discharge permeate. The module may include plural membranes. Given that MD offers the unique opportunity of removal of the aqueous matrix as the means of concentrating streams such as in waste treatment, desalination of salt and brackish water and preconcentrating the analytes, improved membranes in accordance with the present disclosure can be used for a wide range of inorganic and organic compounds.

In accordance with one objective the present disclosure provides a membrane distillation method for waste treatment as well as sample preparation for organic compounds including those of pharmaceutical origin. One aspect of the present disclosure provides a MD preconcentration technique that results in pure water being generated in the permeate. Membranes with CNTs incorporated therein tested under a variety of conditions revealed unexpectedly superior results over membranes without CNTs. Incorporating nano carbons into the structure of a membrane such as for example into the pore structure of a hollow fiber porous hydrophobic membrane can enhance enrichment by membrane distillation of trace quantities of pharmaceuticals in an aqueous solution. At the same time pure water is generated from the waste water.

In yet a further embodiment a membrane distillation system is provided having a heat exchanger operably connected to a membrane module having at least one membrane with nano carbons such as CNTs incorporated therein, a sample collection/injection element operably connected to an outlet of the membrane module, a chromatography column such as but not limited to a HPLC column for receiving concentrate and a optionally a detector for online analysis. The detector may be any suitable detector such as a UV detector or the like. The system may include a pump for feeding solution to the membrane module.

Furthermore, methods of membrane distillation for preconcentration and solvent removal are provided which may include providing at least one membrane such as a hollow fiber porous hydrophobic membrane, the at least one membrane including nano carbons such as carbon nanotubes incorporated into the structure of the membrane, feeding a sample solution to a heat exchanger, introducing the sample solution to the at least one membrane including nano carbons, and filtering the sample solution to produce a concentrate. The method may further include analyzing the concentrate.

In accordance with one embodiment solvent reduction for membranes with CNTs was as much as 28% higher than for membranes without CNTs. The CNTs serve as a means to increase vapor transport capacity of methanol across the membrane.

In accordance with another embodiment desalination systems and processes are provided employing nano carbon enhanced membranes. To that end, a membrane distillation desalination system is provided including a heat exchanger operably connected to a membrane module comprising at least one membrane having nano carbons incorporated therein, the membrane module having a vacuum port and a sweep air port. The membrane module may include plural membranes. A pump may be included for feeding solution to the membrane module.

In a further embodiment a method of membrane distillation desalination may include providing at least one membrane, the at least one membrane including nano carbons incorporated into the structure of the membrane, feeding a solution to be desalinized to a heat exchanger, introducing the solution to the at least one membrane having the nano carbons, and filtering the solution.

In a further embodiment a membrane distillation system for generating pure water from waste water and preconcentrating waste is provided including a heat exchanger operably connected to a membrane module having at least one membrane including nano carbons incorporated into the structure of the membrane, the membrane module comprising a water flow on a permeate side.

BRIEF DESCRIPTIONS OF THE DRAWINGS

The teachings of the present invention can be readily understood by considering the following detailed description in conjunction with the accompanying drawings, in which:

FIG. 1 a scanning electron microscope image of a prior art membrane;

FIG. 1A a scanning electron microscope image of a membrane incorporating carbon nanotubes (CNT) in accordance with one embodiment of the present disclosure;

To facilitate understanding, identical reference numerals have been used, where possible, to designate identical elements that are common to the figures.

DETAILED DESCRIPTION OF THE INVENTION

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

Figure 1:
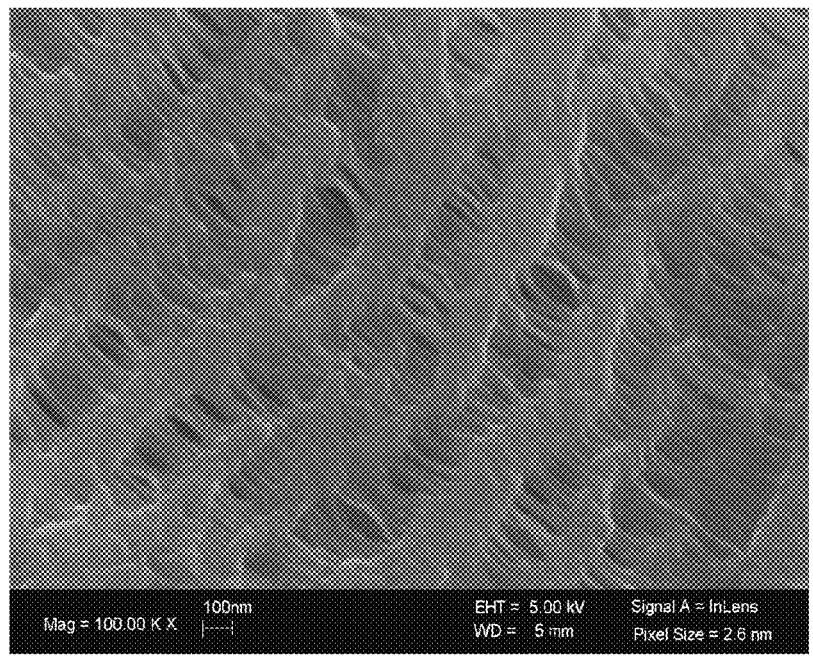

Now referring to FIG. 1, a prior art membrane for membrane distillation is shown. Now referring to FIG. 1A, a membrane for membrane distillation in accordance with the present disclosure is depicted wherein carbon nanotubes (CNTs) are incorporated into the pore structure of a hollow fiber porous hydrophobic membrane. The membrane material is a hollow fiber porous hydrophobic membrane. Any suitable material may be employed such as Celgard type X-50 hollow fiber membrane available from Celgard, LLC of Charlotte, N.C. A wide range of membranes that may be porous, nonporous, composite, hydrophilic or hydrophobic may be employed in connection with presently disclosed subject matter. Flat membranes may be used. Other forms of nanocarbons can also be substituted for carbon nanotubes.

In accordance with one embodiment, membranes in accordance with FIG. 1A may be prepared as follows. CNTs may be prepared by dissolving PVDF in acetone and adding carbon nanotubes such as multiwalled carbon nanotubes (MWTNs) and then sonicating. Membrane modules including one or more membranes may be employed constructed in a shell and tube format having an inlet and outlet. Vacuum may be drawn on the inlet side of the module and the outlet side placed into the dispersed CNT solution. The CNTs may be drawn up through the membrane(s). The vacuum may be stopped, and acetone then pumped through the module to remove excess CNTs.

Figure 1A:
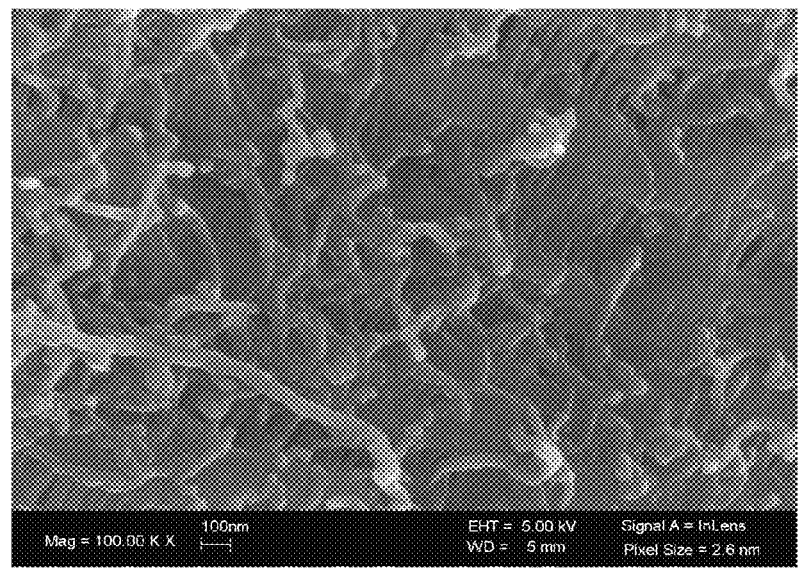
Figure 2:
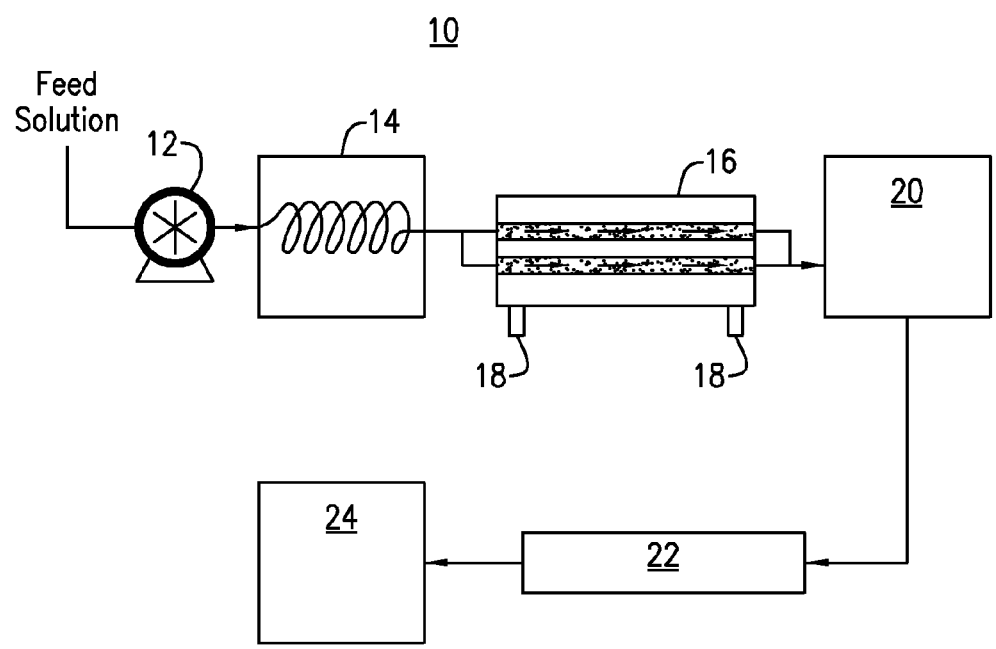
FIG. 2 is schematic diagram of a membrane distillation system including a membrane module employing CNIM membranes in accordance with one embodiment of the present disclosure.

Now referring to FIG. 2 a membrane distillation system 10 is disclosed including at least one membrane in accordance with FIG. 1A. System 10 may include a pump 12, heat exchanger 14, hollow fiber membrane module 16 with drain ports 18, sample collection/injection element 20, HPLC column 22 and UV detector 24. Sample solution is fed via pump 12 to heat exchanger 14, such as but not limited to a water bath, and introduced into membrane module 16. As solution travels up the length of the module, permeate is discharged through the drain ports 18. Concentrate is collected in sample collection/injection element 20, introduced to HPLC column 22 and analyzed in UV detector 24. Experiments were conducted to compare the membranes with CNTs to membranes without CNTs with respect to preconcentration. The experimental examples herein are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. The experimental set up was as shown in FIG. 2.

The membrane material used in one experiment was Celgard type X-50 hollow fiber membrane. A membrane module was constructed in a shell and tube format using threaded brass pipe fittings. The "shell" portion of the module for this particular experiment was a ¼ inch ID×1.5 inch long brass threaded pipe fitting. To each end of this was attached a T fitting, through which the membrane was introduced. The ends were then sealed with epoxy to prevent leakage into the shell side and the assembled module 16 was insulated with fiberglass insulation. The vertical leg of each T-fitting acted as a drain port. A total of 36 membrane strands were used in each module.

Certain experiments utilized membrane modules with plain membranes while other embodiments utilized membranes with CNTs referred to herein as carbon nanotube immobilized membranes (CNIMs). CNIMs were prepared wherein CNTs were prepared by dissolving 0.1 mg of PVDF in 15 ml of acetone and adding 10 mg of MWTNs and then sonicating for 3 hours. Vacuum was drawn on the inlet side of the module and the outlet side was put into the dispersed CNT solution. The CNTs were drawn up through the membranes and then vacuum was stopped, acetone was then pumped through the module to remove excess CNTs.

Test solution was pumped through the module using a pump. The solution traveled through ⅛ inch Teflon tubing that was coiled and immersed in a water bath. The Teflon tubing was connected to the inlet of the module. As solution traveled up the length of the module, permeate was discharged through the drain port fittings.

Four exemplary embodiments were tested. These embodiments included membrane systems testing ibuprofen (an anti-inflammatory) dibucaine (a topical anesthetic), acetaminophen (an analgesic) and diphenhydramine (an antihistamine). The embodiment used to test diphenhydramine was analyzed using a Zorbax SB-CN 250 mm×4.8 mm column. The embodiments used to test ibuprofen, acetaminophen and dibucaine were analyzed using Supelco C-18 250 mm×4.6 mm columns. Analysis for ibuprofen, dibucaine and diphenhydramine embodiments were completed using methods detailed in USP Monographs for Ibuprofen, Dibucaine Hydrochloride and Diphenhydramine USP31-NF26.

Figure 3:
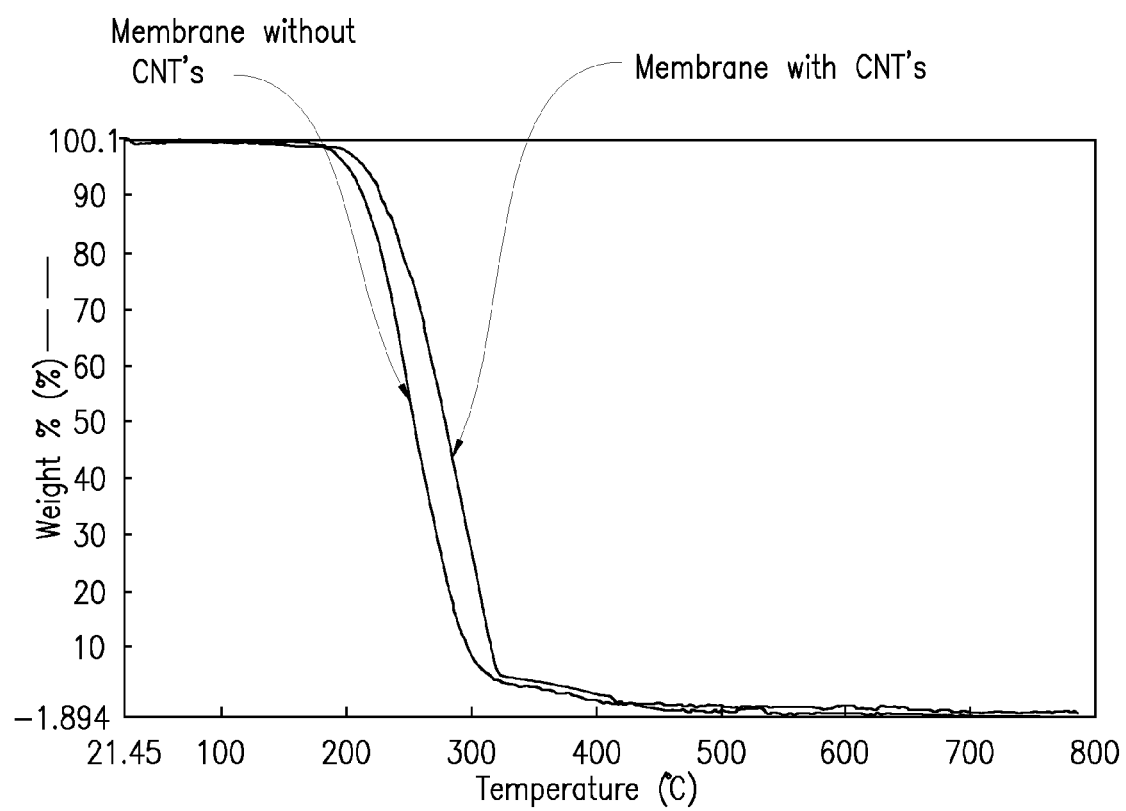
FIG. 3 is a graphical representation of TGA analysis of membranes with and without CNTs in accordance with an embodiment of the present disclosure.

The analysis for acetaminophen was completed using a method found in the literature. See, Marin, A. et al., *J. Pharmaceutical and Biomedical Analysis* 2002, 29:4, 701. Further, thermal gravitational analysis (TGA) was performed in experiments employing both types of membranes. Now referring to FIG. 3, results show that embodiments of the presently disclosed subject matter utilizing membrane with CNTs had a higher thermal profile than did embodiments with membrane without nanotubes. Process optimization experiments were conducted utilizing 5 mg/L ibuprofen solution in deionized water. The concentration effects were measured as Enrichment Factor (EF) and calculated by:

$$EF = \left(\frac{C_o}{C_i}\right)$$

where $C_o$ is the outlet analyte concentration and $C_i$ is the inlet concentration.

Figure 4:
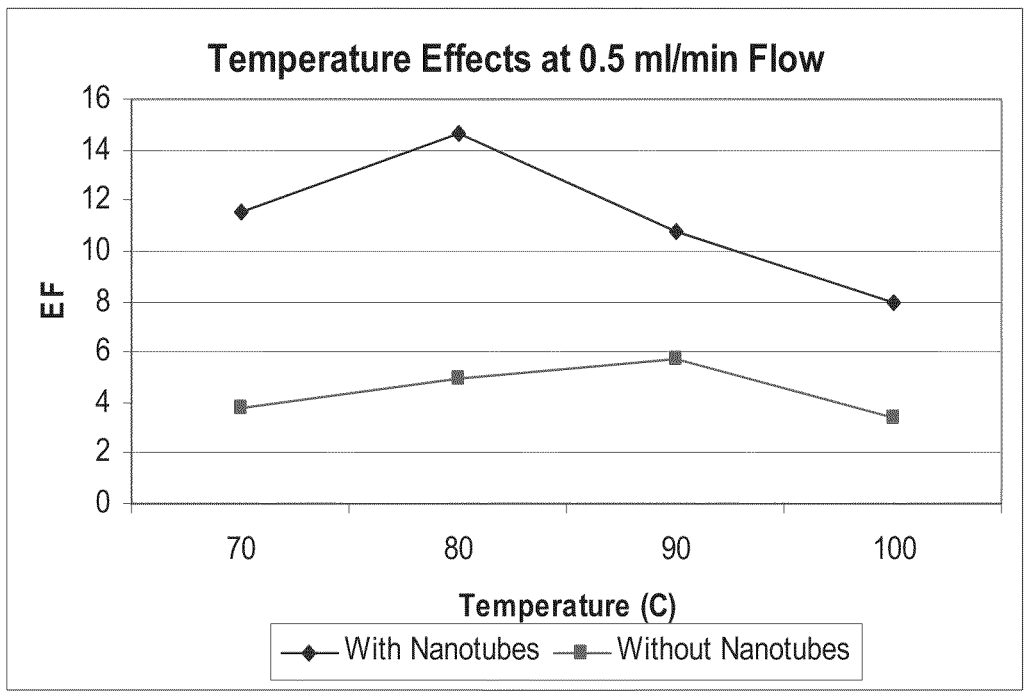
FIG. 4 is a graphical representation showing temperature effects in accordance with one embodiment of the present disclosure.
Figure 5:
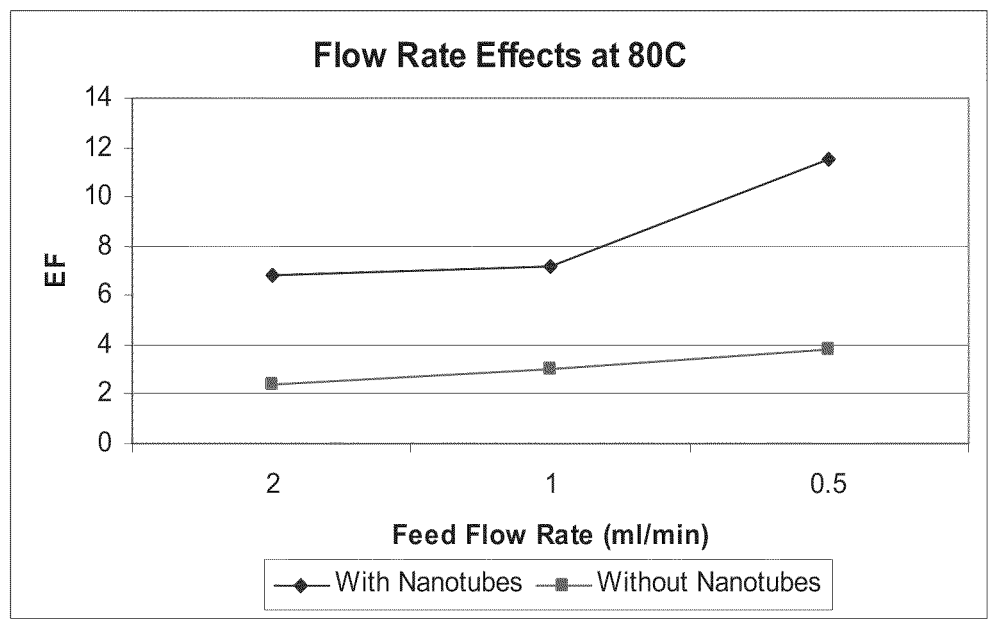
FIG. 5 is a graphical representation showing flow rate effects in accordance with one embodiment of the present disclosure.

Now referring to FIG. 4, for temperature, maximum enrichment occurred at 80° C. feed solution temperature for the module with CNTs and at 90° C. for the module without CNTs. With further reference to FIG. 5, for both the membrane modules with and without CNTs, maximum enrichment occurred at a flow rate of 0.5 ml/minute.

Figure 6:
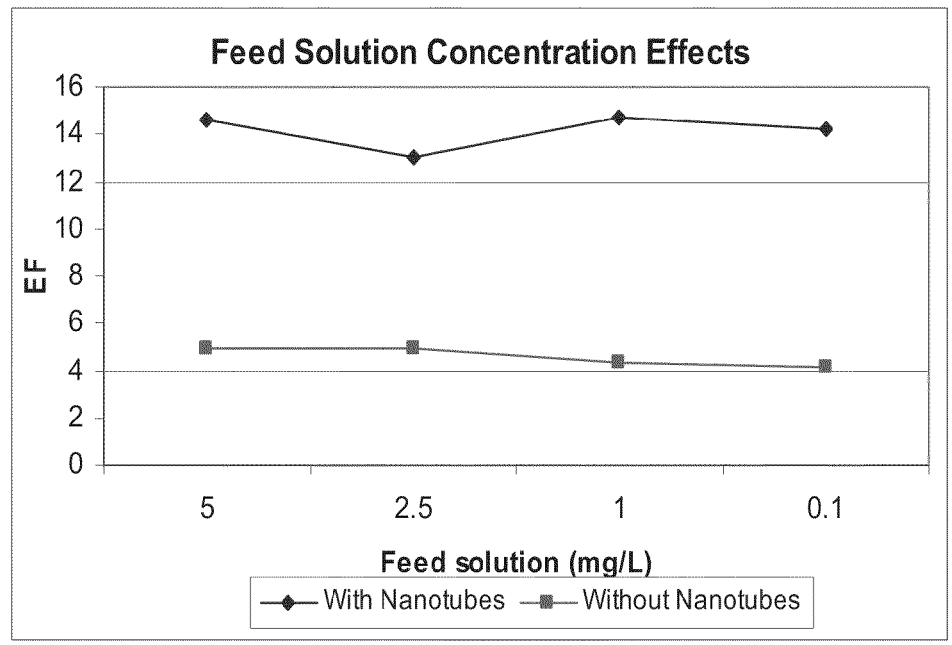
FIG. 6 is a graphical depiction showing feed solution concentration effects in accordance with one embodiment of the present disclosure.
Figure 7:
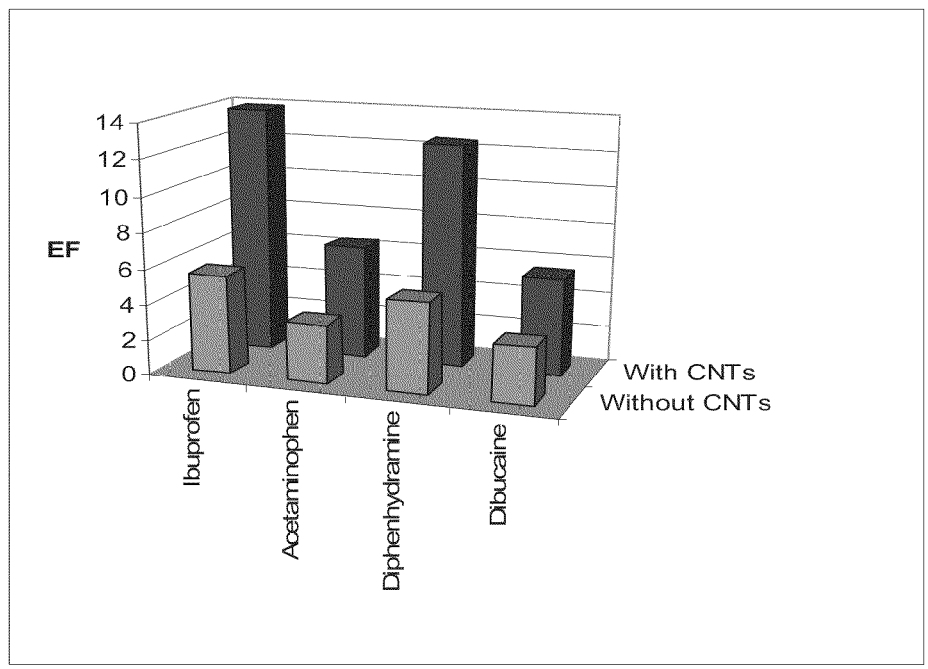
FIG. 7 is a graphical depiction showing effects for four pharmaceutical compounds in accordance with an embodiment of the present disclosure.

Further experimentation was conducted utilizing at a feed flow of 0.5 ml/minute and at feed solutions of 80° C. and 90° C. respectively for the modules with and without CNTs. Experiments were then conducted to determine if the enrichment was constant over a range of ibuprofen feed solution concentrations. The results for this are shown in FIG. 6. Following this, the experiments were repeated for acetaminophen, dibucaine and diphenhydramine. These all had similar results to the ibuprofen in terms of flow rate, temperature and solution concentration. Results comparing the four compounds are shown in FIG. 7.

For the MD process, the actual rate of transport across the membrane surface at each temperature can be explained in accordance with Babu, B. R. et al., *J Membrane Science*, 2008, 322, 146-153, by: $Q=(J_w \rho \Delta H_v)-h_m(T_{m1}-T_{m2})$ where Q is the increase in flux rate due to temperature, $J_w$ is the water flux, $\rho$ is the water vapor pressure, $\Delta H_v$ is water latent heat of vaporization, $h_m$ is the membrane heat transfer coefficient, $T_{m1}$ and $T_{m2}$ are the temperature at the feed side and permeate sides of the membrane surface. Further, the water vapor pressure can be related to the activity of water at the membrane surface by: $p_{wm}=P_{w,Tm}a_{wm}$ where $p_{wm}$ is the water vapor pressure at the membrane surface, $P_{w,T}$ is the vapor pressure of pure water at temperature $T_m$ and $a_{wm}$ is the water activity at the membrane surface.

Further, the diffusion coefficient across the membrane is known to increase with temperature via an Arrhenius type expression:

$$D = D_o \exp\left(\frac{-E_a}{RT}\right)$$

where D is the diffusion coefficient, $D_0$ is the reference temperature diffusion coefficient, $E_a$ is the activation energy, R is the ideal gas constant and T is the temperature. See, Bishop, E. J.; Mitra, S., *J. Chromatography A,* 2004, 1046, 11-17.

With MD, the flow rate effects of the feed solution to the membrane can be estimated by the following equation:

$$J_w = \frac{\rho}{A_f} \frac{(\Delta V)}{(\Delta T)}$$

where $J_w$ is the flux, $\rho$ is the water density at the related temperature, $A_f$ is the filtration area of the membrane, and $$\frac{(\Delta V)}{(\Delta T)}$$

is the water volumetric flux per unit time. See, Al-Asheh, S. et al., *Desalination,* 2006, 195, 60-68.

Various characteristics of CNTs may explain why they enhance the concentration of trace ingredients using MD when imbedded into the pores of the membrane. First, it is well established that CNTs have high thermal conductivity (See, Hone, J. et al., *Physical Review B,* 1999, 15-4, 2514-2516) and the additive effect of CNTs to the thermal conductivity of a membrane can be estimated by:

$$\frac{K_c}{K_m} = 1 + \frac{fK_c}{3K_m}$$

where $K_c$ is the thermal conductivity, $K_m$ is the matrix phase (e.g. membrane) thermal conductivity and f is the volume fraction of the nanotubes. See, Nan et al., *Chemical Physics Letters,* 2003, 375, 666-669. It is suggested this increased thermal conductance effect reduces heat loss at the vapor-membrane interface, allowing more pure vapor to pass the membrane's pores. This higher temperature in turn will lower the surface tension at the pores allowing for easier transport.

Second, CNTs have high aspect ratios. This increases the active surface area which may also contribute to enhanced transport through the membrane's pores. This increase in surface area may also lead to the formation of smaller droplets of water. When a liquid forms smaller droplets, its equilibrium vapor pressure is greater than its surroundings and this requires a vapor pressure many times the vapor pressure for a "normal" size water droplet. This increase in vapor pressure on the lumen side of the membrane compared to the colder outside of the membrane causes an increased differential which favors the transport of more vapor across the membrane pore. This effect may also increase the diffusion coefficient between the two phases on either side of the membrane pore.

Further, as the CNTs line the interior of a pore in the membrane, they may form channels through which the water molecules will travel. Because of their hydrophobic nature, the CNTs may provide an evenly distributed charge along the channel, and this charge repulsion may cause water molecules to be transported very easily through the channel. This coupled with the very smooth surface of the exterior of the CNTs provides a mechanism for enhanced water movement. Since water is selectively delivered to the membrane pore, the water activity is higher than in the mixed solution phase. This may result in a higher water activity, and allow for greater transport across the pore.

The Enrichment Factor (EF) is set forth above. Extraction Efficiency (EE) is quantified by the following:

$$EE = \frac{C_o V_o}{C_i V_i}$$

wherein $V_i$, $V_o$ are the inlet and outlet solution volumes. Solvent Reduction (SR) is defined as:

$$SR = \frac{V_i - V_o}{V_i} X 100.$$

The results for the experiments are summarized in Table 1. As seen, the EF, EE and SR were significantly improved for all four compounds tested when using embodiments utilizing a membrane module with CNTs. Also, embodiments utilizing a membrane module with CNT showed as much as a 148% increase in enrichment over embodiments utilizing membranes without CNTs. Because of their chemical and surface properties, it is surmised the CNTs had an effect on the membrane allowing this.

TABLE 1

| Analytes | Plain Membrane | | | With CNTs | | | Enrichment |
|---|---|---|---|---|---|---|---|
| | EF | EE | SR | EF | EE | SR | Enhancement (%) |
| Ibuprofen | 5.6 | 4.26 | 28 | 13.9 | 5.56 | 60 | 148.2 |
| Acetaminophen | 3.3 | 2.44 | 26 | 6.4 | 2.82 | 56 | 93.9 |
| Diphenhydramine | 5.1 | 3.98 | 22 | 12.5 | 5.25 | 58 | 145.1 |
| Dibucaine | 3.2 | 3.01 | 6 | 7.0 | 4.62 | 34 | 118.8 |

Using the system shown in FIG. 2 further experiments were conducted to determine if membrane distillation coupled with HPLC is an effective means to provide online sample concentration and analysis for trace levels of pharmaceutical ingredients in methanol. A membrane module as described above was used. A total of 36 membrane strands were used in each module. Polyflo tubing was attached to the base leg of one of the T fittings and the other end of the tubing was attached to a vacuum source. When vacuum was turned on, room temperature air was drawn in through the other T fitting at a rate of 1 L/minute. The module was tilted at a 45° angle to promote draining Experiments were conducted using modules with plain membranes and with modules in which the membranes contained CNTs. Multi Walled Nanotubes (MWNT) from Cheap Tubes, Inc. were used. The CNTs were prepared as above. Test solution was pumped through the module using a Hewlett Packard HPLC 1050 pump. The solution traveled through ⅛ inch teflon tubing that was coiled and immersed in a water bath. Water bath temperature was controlled to a set temperature using a hot plate and monitored using a thermometer. The Teflon tubing was connected to the inlet of the module. As solution traveled up the length of the module, permeate was discharged through the drain port fittings. The concentrate at the far end of the module was collected into 2 ml HPLC vials. All analysis was completed using a Hewlett Packard 1050 HPLC system and a Perkin Elmer 785 UV-Vis analyzer. SRI's (Torrance, Calif.) Peak Simple Version 3.29 was used for HPLC data analysis. The compounds tested were ibuprofen, dibucaine, acetaminophen and diphenhydramine using the same columns and methods used in the foregoing experiments.

Figure 8:
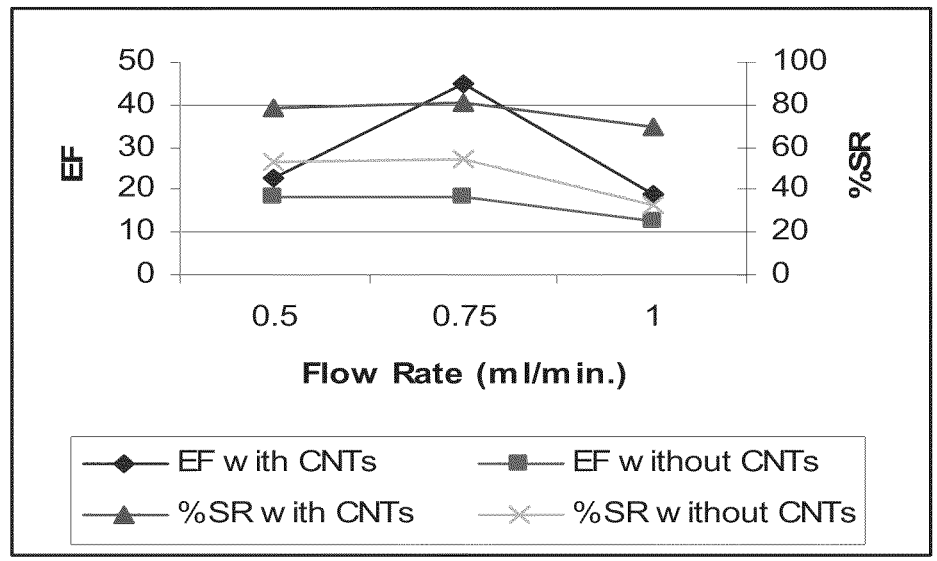
FIG. 8 is a graphical depiction of EF and % SR as a function of feed flow rate in accordance with one embodiment of the present disclosure.
Figure 9:
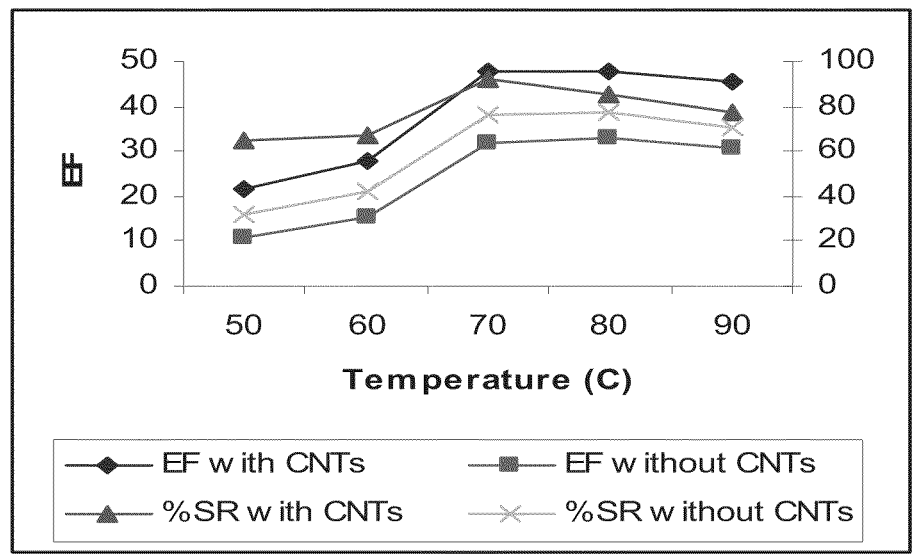
FIG. 9 is a graphical depiction of EF and % SR as a function of feed solution temperature in accordance with one embodiment of the present disclosure.

The amount of concentration for both the carbon nanotube immobilized membrane and the plain membrane was measured as EF. Percent solvent reduction (% SR) was also determined. Process optimization was carried out using a 5 mg/L ibuprofen solution in methanol. For both the membrane modules with and without CNTs, maximum enrichment occurred at a flow rate of 0.75 ml/minute. Further, maximum enrichment occurred when aqueous feed solution was 70° C. These results are shown respectively in FIGS. 8 and 9.

Figure 10:
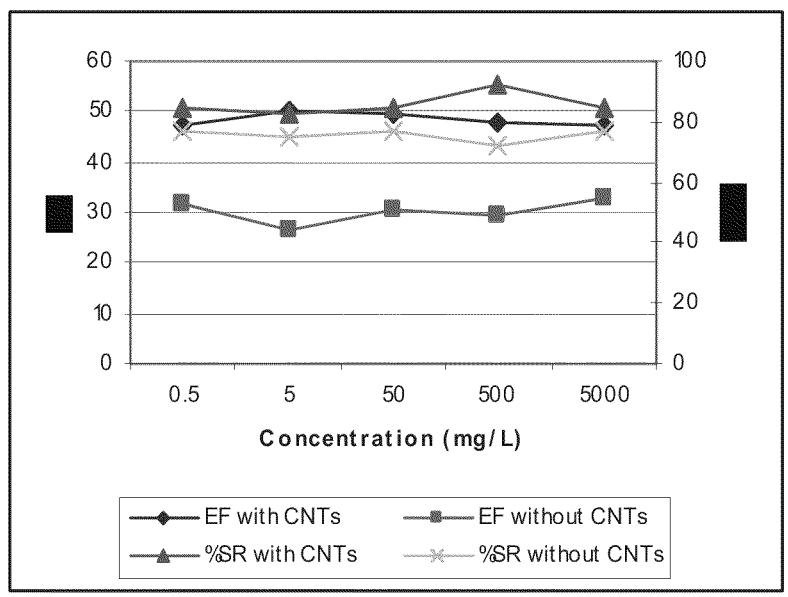
FIG. 10 is a graphical depiction of EF and % SR as a function of concentration in accordance with one embodiment of the present disclosure.

The effect of feed concentration at constant flow and temperature is shown in FIG. 10. It was observed that concentration and solvent reduction did not change significantly with feed solution concentration in the range of 0.5 to 5000 mg/L.

Figure 11:
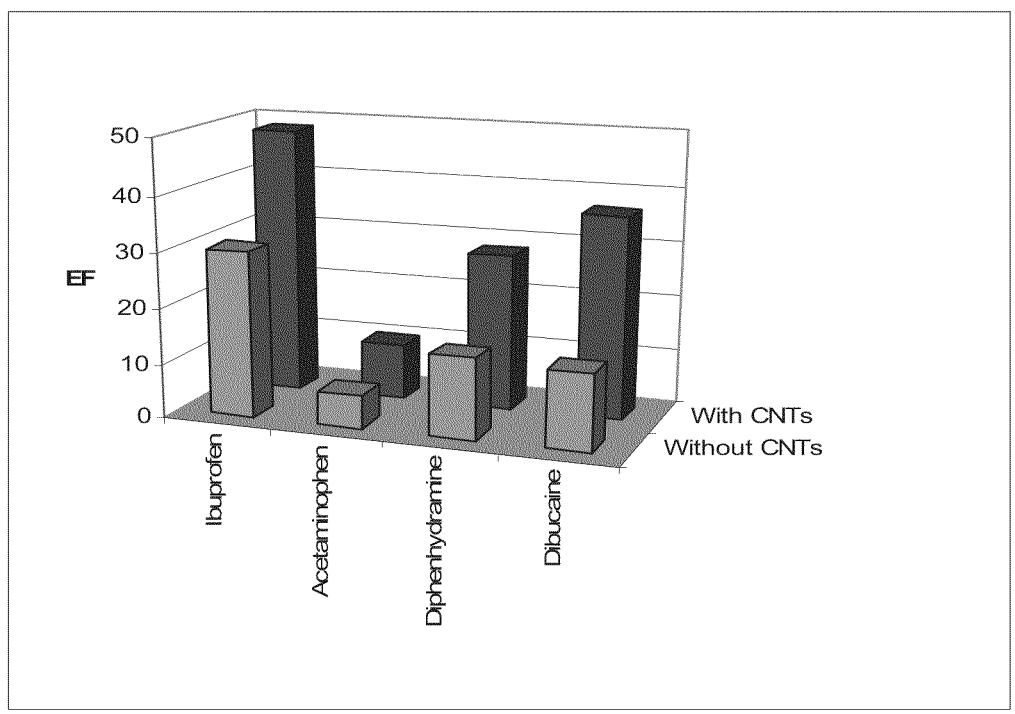
FIG. 11 is a graphical depiction of EF for four pharmaceutical compounds in accordance with one embodiment of the present disclosure.

Experiments were repeated with acetaminophen, dibucaine and diphenhydramine. These showed similar results to the ibuprofen in terms of flow rate, temperature and solution concentration. Results for EF comparing the four compounds are shown in FIG. 11. In each case the presence of CNTs enhanced the methanol permeation and concentration of pharmaceuticals. The results for the experiments are summarized in Table 2. As seen, the EF and % SR were significantly improved for all four compounds tested when using the membrane module with CNTs. Because of their chemical and surface properties, it is surmised the CNTs had an effect on the membrane allowing this. The RSD for all experiments was between 2-5%. Both the limit of detection and the limit of quantitation were less than 0.1 mg/L. For the four compounds tested, EF was linear in the range of 0.1 through at least 50 mg/L.

TABLE 2

| Analytes | EF CNIM | EF Plain | % Enhancement | % SR CNIM | % SR Plain | % Enhancement |
|---|---|---|---|---|---|---|
| Ibuprofen | 48.58 | 30.13 | 161.2 | 96 | 75 | 28 |
| Acetaminophen | 10.14 | 6.10 | 166.2 | 80 | 65 | 23 |
| Diphenhydramine | 28.28 | 14.72 | 192.1 | 92 | 74 | 24 |
| Dibucaine | 36.68 | 13.76 | 266.6 | 95 | 81 | 14 |

Desalination

In accordance with another embodiment, CNIMs in accordance with the present disclosure may be employed as an effective means of desalination and water purification via membrane distillation. Membrane distillation is a low energy alternative to thermal, chemical and reverse osmosis technologies for desalination of sea and brackish waters. As described herein, in MD, a heated aqueous solution is passed through the lumen of a hydrophobic fiber, which prevents the transport of the liquid phase across the membrane. MD relies on the net flux of water vapor from the warm to cool side of the membrane. Again, the driving force is the vapor pressure difference across the membrane, which is dependent on the temperature difference.

Figure 12:
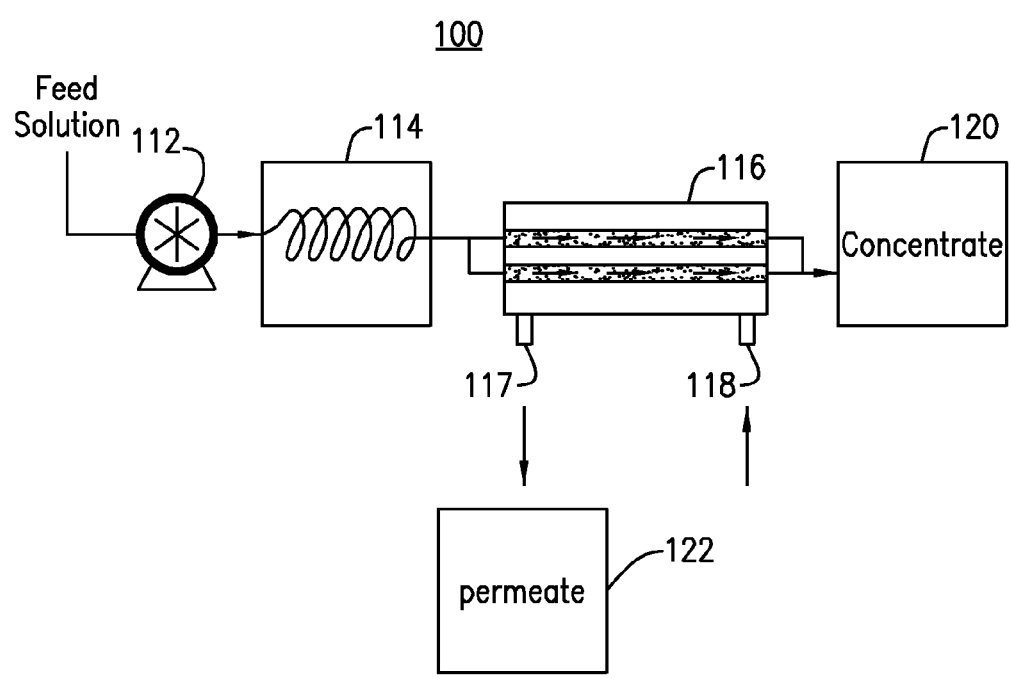
FIG. 12 is schematic diagram of a membrane desalination system including a membrane module employing CNIM membranes in accordance with one embodiment of the present disclosure.

Now referring to FIG. 12, a novel desalination system 100 may include a pump 112, heat exchanger 114, hollow fiber membrane module 116 with vacuum port 117 and sweep air port 118, collection element 120 and permeate collection element 122. Hollow fiber membrane module 116 may be as described above with reference to FIG. 2 and may include multiple hollow fiber strands. Solution is fed via pump 112 to heat exchanger 114, such as but not limited to a water bath, and introduced into membrane module 116. As solution travels the length of the module 116, permeate is discharged through vacuum port 117 to collection element 120.

Experiments were conducted to evaluate the system 100. The membrane modules for MD were constructed in a shell and tube format using ¼ inch tubing and threaded brass pipe fittings. Thirty six, 6-inch long hollow fiber strands were used in the module. Each module contained approximately 0.21 $cm^2$ of effective membrane contact area (based on fiber internal diameter). The ends were then sealed with epoxy to prevent leakage into the shell side. Vacuum was applied to one drain port to draw air through the other port, which created a higher pressure differential and provided a sweep air. Air flow was regulated at a rate of 1 liter $min^{-1}$. The CNIM was prepared using Celgard type X-50 (Celgard, LLC, Charlotte, N.C., USA) hollow fiber as the starting material. The process was as follows: ten milligrams of multiwall nanotubes (Cheap Tubes, Inc., Brattleboro, Vt., USA) were dispersed in a solution containing 0.1 mg of polyvinylidene fluoride in 15 ml of acetone by sonicating for an hour. The PVDF/CNTs dispersion was forced under vacuum into the pore structure of the polypropylene membrane. The CNIM was produced during this step and the PVDF served as glue that held the CNTs in place. The membrane was flushed with acetone to remove excess CNTs and PVDF. Membrane morphology was studied using scanning electron microscopy (Leo, Model 1550) and thermo gravimetric analysis (TGA) was performed using a Perkin Elmer Pyris instrument.

The experimental system employed was as shown in FIG. 12. The salt mixture used in these experiments contained 88% NaCl and 12% $MgSO_4$. The solutions tested ranged from 10 to 34,000 mg $L^{-1}$. The water to be treated was pumped through the module using a HPLC pump. The solution traveled through a heat exchanger (eater bath in this case) which allowed it to be heated to the desired temperature. As the solution traveled up the module, the permeate was discharged through the drain port and collected in a vacuum trap. The ionic strength of the original solution, the permeate and the concentrate were measured using an Oakton EC Testr 11+ multi range conductivity meter. All experiments were repeated in triplicate and the relative standard deviation of these measurements was found to be less than 5%.

The incorporation of CNTs in membranes was clearly evident, and the CNTs were found to be uniformly distributed. TGA indicated that the CNIM contained approximately 0.5% CNTs by weight. It was also observed the presence of CNTs enhanced the thermal stability of the membrane by increasing the onset of thermal degradation by as much as 29° C. This is an important factor for MD, where the elevated temperatures can affect the membrane material.

Figure 13:
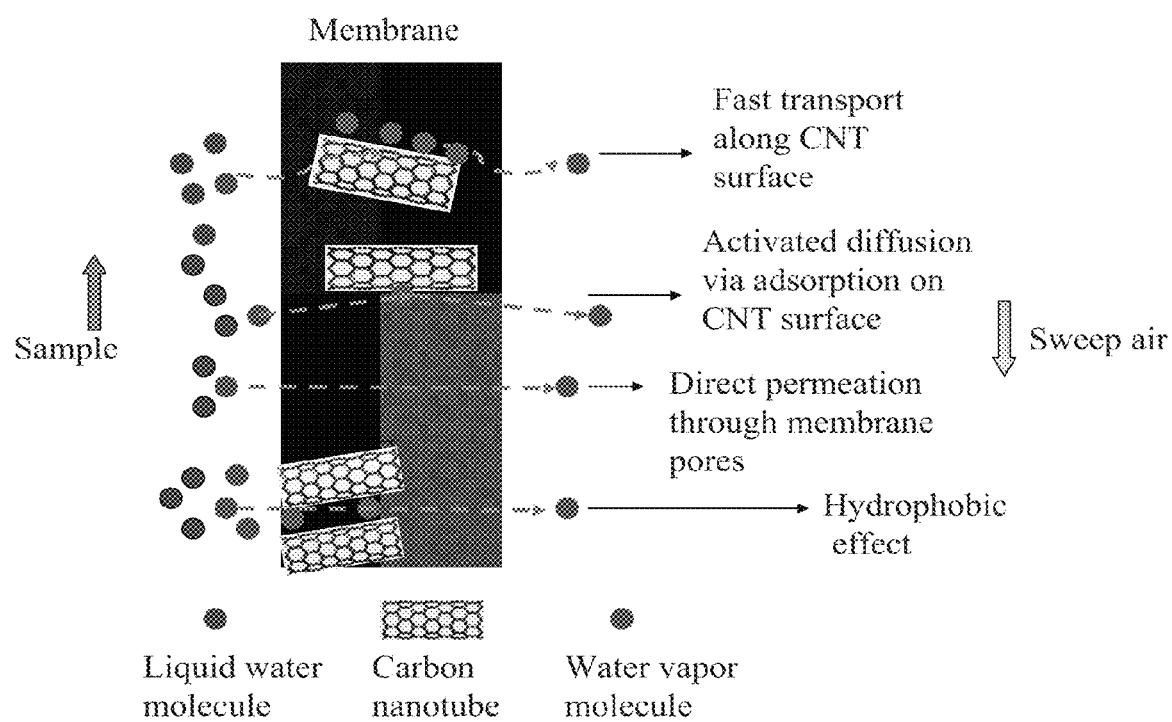
FIG. 13 is schematic diagram depicting mechanisms of MD in the presence of CNTs in a membrane in accordance with one embodiment of the present disclosure.

The proposed mechanisms of permeation in the presence of CNTs are shown in FIG. 13. Immobilizing the CNTs in the pores alters the water-membrane interactions, which is one of the major physicochemical factors affecting the permeability and selectivity of the membrane. Polotskaya, G. A. et al., *Desalination* 2006, 200, 400-402. Since CNTs are highly hydrophobic, they decrease the tendency of a pore to become wet with liquid, so higher transport of pure vapor can occur. It is well known that gas flow across a membrane pore follows Knudsen, Fickian or molecular diffusion. See, Alves, V. D.; Coelhoso, I. M., *J. Membr. Sci.* 2004, 228, 159-167; Alboy, S. et al.; *AIChE J.* 2006, 52, 3679-3687; Gilrong, J.; Soffer, A. *J. Membr. Sci.* 2002, 209, 339-252. Since CNTs are known to have rapid sorption and desorption capacity (Hussain, C.; Mustansar, S.; Mitra, S. *Analyst* 2009, 134, 1928-1933; Dehouche, Z. et al., *Nanotechnology* 2005, 16, 402-409; Staszczuk, P. et al., *J. Therm. Anal. Calorim.* 2006, 86, 245-253), it is possible they allow the water vapor molecules to follow a surface diffusion pattern, in which the solute hops from one site to another by interacting with the surfaces. This action may increase overall vapor transport. The CNTs can also provide an alternate route for fast mass transport via diffusion along their smooth surface. See, Striolo. A. *Nano Lett.* 2006, 6, 633-639; Thomas, J. A.; McGaughey, A. J. H. *Nano Lett.* 2008, 8, 2788-2793. The water vapor may also be transported directly through the inner tubes of the CNTs, which are known to enhance vapor transport (Fujiwara, A. et al., *Chem. Phys. Lett.* 2001, 336, 205-211).

In addition, the higher thermal conductivity of the CNTs reduces the temperature gradient in the membrane pores, thus reducing condensation and allowing more vapor to permeate through the pores. The condensation of water is known to reduce the hydrophobicity of the membrane leading to the attraction of more water molecules which may eventually lead to pore clogging. The presence of CNTs reduces these effects. The relatively uniform temperature distribution leads to higher temperature in the permeate side of the membrane and lowers the surface tension in the pores, thus allowing easier transport of water vapors. The additive effect of the CNTs thermal conductivity to the overall membrane conductivity can be estimated by:

$$\frac{K_c}{K_m} = 1 + \frac{fK_c}{3K_m}$$

where $K_c$ is the thermal conductivity of the liquid, $K_m$ is the matrix phase (e.g. membrane material) thermal conductivity and f is the volume fraction of CNTs. See, Nan, C. W. et al., *Chem Physical Letters,* 2003, 375, 666-669.

The rate of mass transport through the membrane, Q, is controlled by the diffusion of water vapor under a partial pressure gradient, and can be estimated under steady-state conditions by use of the following equation:

$$Q = BAD(\Delta P)C_w/b$$

where, A is the surface area of the membrane, D is the diffusion coefficient in the membrane material, $\Delta P$ is the vapor pressure gradient, b is the thickness of the membrane, B is a geometric factor defined by the porosity of the membrane and $C_w$ is the water vapor concentration. See, Pawliszn, J., *Anal. Chem.* 2003, 75, 2543-2558. The presence of CNTs affects several of these parameters; B and D are altered by the presence of the smooth and frictionless surface of CNTs, while the partition coefficient is affected by the excellent sorbent characteristics of the CNTs and their high surface area facilitates greater flux.

The nanoscale CNT morpohology may also lead to the formation of smaller droplets of solvent, which will increase equilibrium vapor pressure. See, Tolman, R. C. *J. Chemical Physics,* 1949, 17-3, 333-337. This increase in vapor pressure on the lumen side of the membrane compared to the colder side will increase the mass transport.

Figure 14:
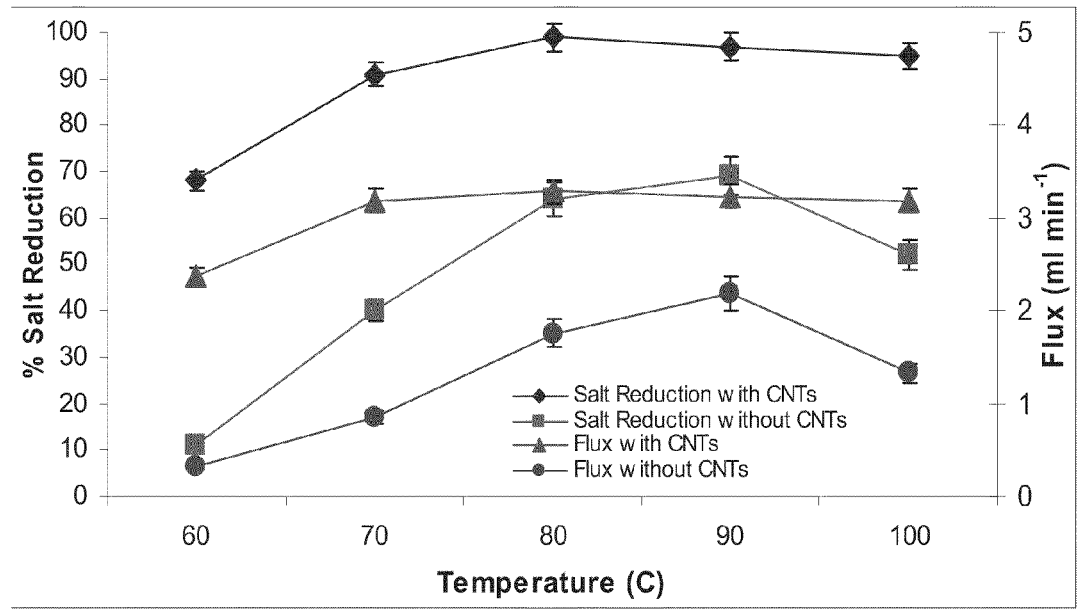
FIG. 14 is a graphical depiction showing the effect of temperature on salt reduction and flux at a feed flow rate of 0.5 ml min$^{-1}$ in accordance with one embodiment of the present disclosure.

MD experiments were carried out in the range of 60-100° C. Now referring to FIG. 14, for both membrane types, the salt reduction and flux increased with temperature up to 80° C. There was a leveling off and even slight reduction at higher temperatures. The absolute level of salt reduction and flux per $cm^2$ of membrane was higher for CNIM at all temperatures. The incorporation of CNTs generated higher salt reduction and flux at significantly lower temperatures. The effect was most pronounced at lower temperatures. For example at 60° C. and 0.5 ml $min^{-1}$ feed flow, the salt reduction using CNIM was 6 times higher and was nearly the same as that accomplished at 90° C. using the conventional membrane. Both salt reduction and flux reached their peaks at 80° C. when the CNIM was used. The data demonstrates that CNIM can provide significantly higher eco-efficiency, because more pure water generation can be carried out at a significantly lower temperature.

Figure 15:
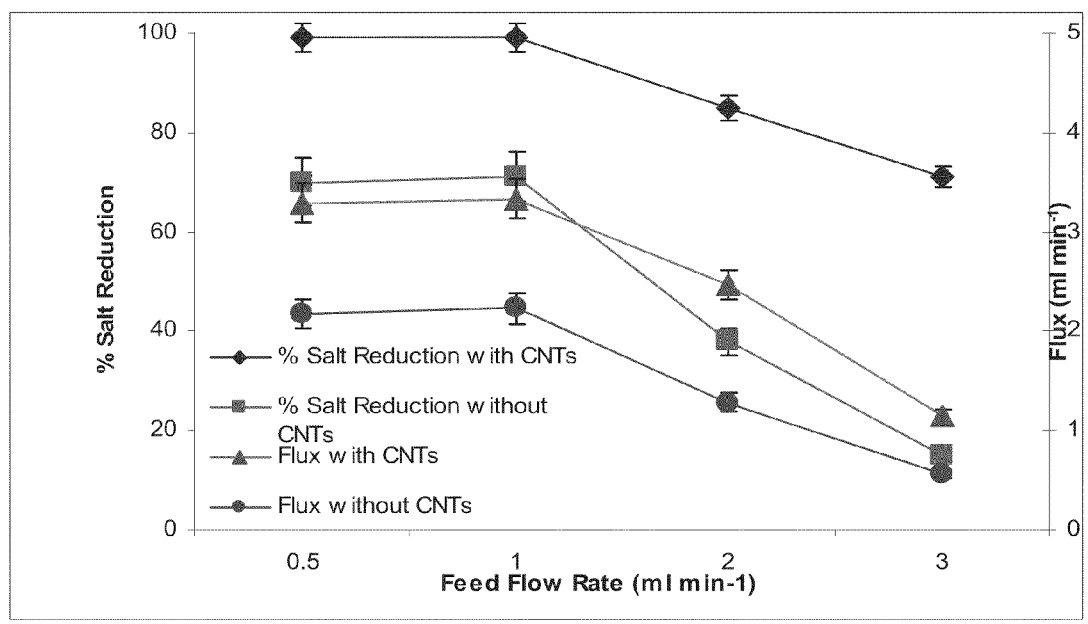
FIG. 15 is a graphical depiction showing the effect of flow rate on salt reduction and flux at 80° C. in accordance with one embodiment of the present disclosure.

Now referring to FIG. 15, desalination as a function of flow rate is shown for feed solution temperature at 80° C. In the flow rate range studied, in both cases the salt reduction and flux per $cm^2$ of membrane decreased with flow rate. Compared to the conventional membrane, the CNIM demonstrated significantly higher flux and salt reduction at all feed flow rates. Flux doubled in the presence of CNTs and salt reduction increased five times. This is attributed to some of the reasons mentioned above, especially the fact that the CNTs serve as sorbent sites for vapor transport while rejecting the liquid water due to its high hydrophobicity. Improvement in salt reduction was observed at all flow rates, which ranged from 1.4 to 4.7 times higher. The ionic radius of $Na^+$ and $Cl^-$ are 1.02 and 1.81 Å respectively (Burgess, J. Ions in Solution: Basic Principals of Chemical Interactions; Ellis Horwood, Chichester, UK, 1988, Ch. 4). It is well known that during reverse osmosis, water clusters exceeding four molecules can transport salt ions through the polymeric membrane (Strathmann, H.; Michaels, A. S. *Desalination* 1977, 28, 195-202). Since the pores here are significantly larger (0.04 micron), the salt permeation in the membranes occurs mainly due to the entrainment of fine liquid droplets in the vapor phase. Therefore, it is concluded that the enhancement in salt reduction in the presence of the CNTs is due to the relatively higher vapor flux and the rejection of water molecules due to higher hydrophobicity. The higher flux and salt reduction have practical ramifications because they lead to significantly higher efficiency processes. Higher salt reduction can be attained at higher flow rates thus requiring less membrane material and energy per unit of water treated.

It is well known that salt reduction in membrane processes decreases with increased salt concentration. See, Zhou, W.; Song, L., *Environ. Sci. Technol.* 2005, 39, 3382-3387; Meltzer, T., Pharmaceutical Water Systems; Tall Oaks Publishing, Littleton, Colo. 1996, Ch. 9. Salt reduction and flux at different feed concentrations were measured. The data is presented in Table 3.

TABLE 3

| feed solution concentration (mg/L) | membranes with CNTs | | membranes without CNTs | |
| --- | --- | --- | --- | --- |
| | % salt reduction | total flux (ml/cm²/min) | % salt reduction | total flux (ml/cm²/min) |
| 10 | 99 | 3.23 | 71 | 2.24 |
| 100 | 93 | 3.19 | 56 | 1.90 |
| 1,000 | 66 | 3.28 | 31 | 2.00 |
| 10,000 | 63 | 3.05 | 2 | 1.86 |
| 34,000 | 53 | 3.09 | 1 | 1.67 |

The measurements were carried out at a flow rate of 0.5 ml $min^{-1}$ and 80° C. These measurements were made in triplicate and represent a relative standard deviation of less than 5%. The results showed a substantial decrease in flux (25%) for the plain membranes as the salt concentration was increased from 10 to 34,000 mg $L^{-1}$. This phenomenon has been reported before. See, Voros, N. G. et al., *Desalination,* 1996, 104, 141-154; Filmtec membranes—Factors affecting RO membrane performance, *DOW form* 609-00055-498*XQRP,* 1998. On the other hand, the CNIM showed no appreciable decrease in flux, most likely due to the hydrophobic nature of the CNTs, which prevented the liquid phase penetration into the membrane. Also, the salt reduction capability of CNIM was significantly higher at all concentrations. These varied from 99% to 53%, while in the plain membrane it was between 71% to 1%. This indicates the CNIM was less susceptible to salt bleed-through than the standard membrane. Once again this is attributed to the CNIM's ability to selectively allow the passage of water vapor.

Mass Transfer in the Presence of Carbon Nanotubes:

The water vapor flux, $J_w$ through the membrane is given by[28]:

$$J_w = k(C^L - C^V) \quad (1)$$

where, k is the mass transfer coefficient and $C^L$ and $C^V$ are the liquid and vapor-phase concentrations. Dutta, K.; Sikdar, S. K., *Environ. Sci. Technol.* 1999, 33, 1709-1716. $C^L$ is the concentration of the exit stream (in mg $L^{-1}$) after the removal of the vapor phase, and $C^V$ is the salt concentration in the condensed vapor phase. Ideally the latter should be close to zero. The reciprocal of k is the overall resistance to mass transfer (Vane et al., *Environ. Sci. Technol.* 2001, 35, 391-397) and:

$$\frac{1}{k} = \frac{1}{k^L} + \frac{1}{k^M} + \frac{1}{k^V} \quad (2)$$

'where, $1/k^L$ is the liquid boundary layer resistance, $1/k^M$ is the membrane resistance and $1/k^V$ is the permeate side boundary resistance. The liquid boundary layer resistance is dependent on parameters such as feed flow rate, viscosity, and density, which depend upon the salt concentration. Membrane resistance is a function of the membrane thickness, temperature and the permeability of water vapor through the membrane. Permeate side boundary layer resistance is relatively small because the vapors are immediately removed. The flux through the membranes was calculated as:

$$J = \frac{w^p}{tA} \quad (3)$$

where J is the flux, $w^p$ is the total mass of permeate collected, t is the permeate collection time and A is the membrane surface area. The overall mass transfer coefficient was calculated by:

$$k = \frac{J}{c} \quad (4)$$

where k is the mass transfer coefficient, J is the flux calculated from equation (3) and c is the feed solution concentration in mg $L^{-1}$.

Figure 16:
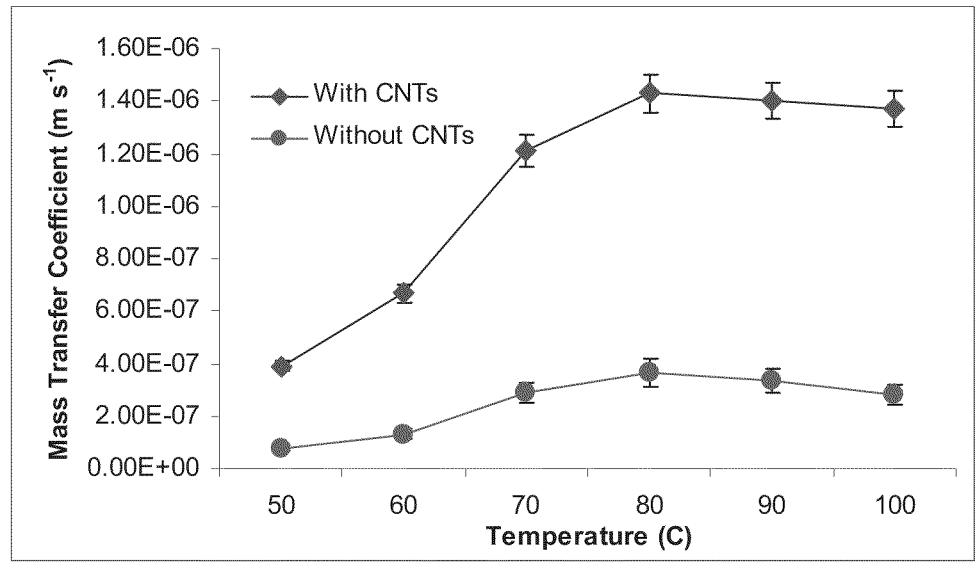
FIG. 16 is a graphical depiction showing mass transfer coefficient as a function of temperature at a feed flow rate 0.5 ml min$^{-1}$ in accordance with one embodiment of the present disclosure.
Figure 17:
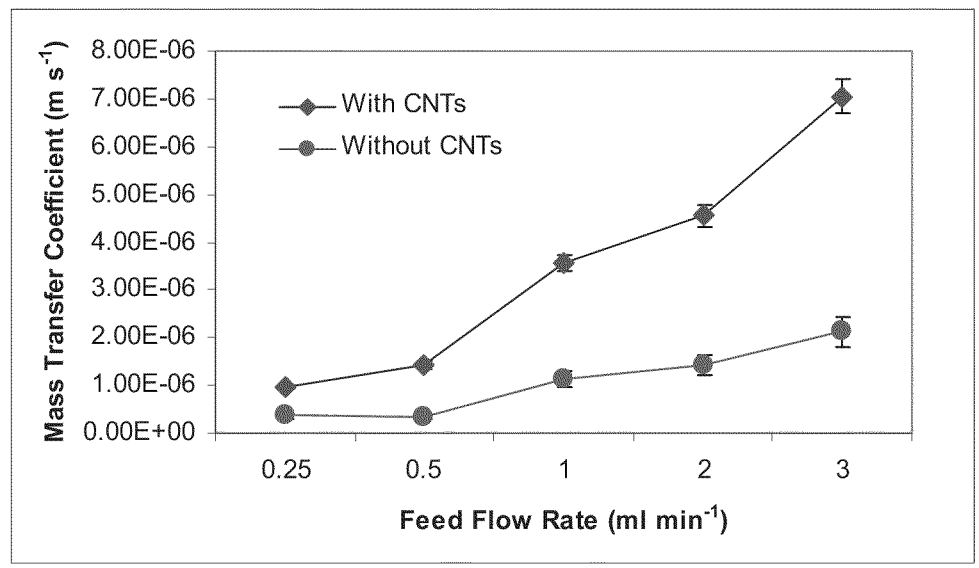
FIG. 17 is a graphical depiction showing mass transfer coefficient as a function of flow rate at 80° C. in accordance with one embodiment of the present disclosure.
Figure 18:
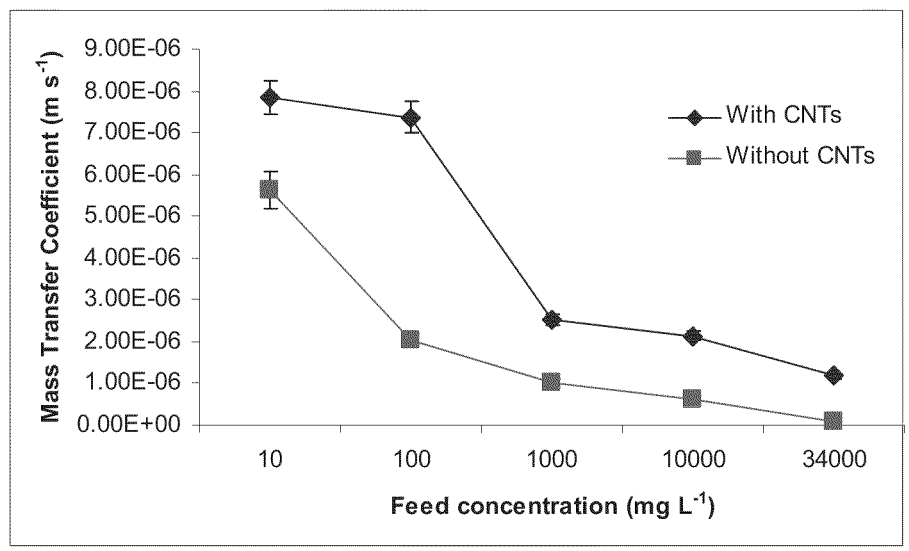
FIG. 18 is a graphical depiction showing mass transfer coefficient as a function of concentration at a flow rate of 0.5 ml min$^{-1}$ and temperature of 80° C. in accordance with one embodiment of the present disclosure.

The mass transfer coefficients at a flow rate of 0.5 ml $min^{-1}$ and different temperatures are presented in FIG. 16, and were found to be 2 to 6 times higher in the presence of the CNTs. The effect of temperature on k was significantly more pronounced for the plain membrane where the increase was nearly 6 fold in the 60° C. to 80° C. range. This was attributed to an increase in the diffusion coefficient. In general, while diffusivity in the membrane increases with temperature, the sorption or the partition coefficient decreased. As a result of these two opposing effects, the overall increase in k was not as pronounced in the presence of the CNTs. FIG. 17 shows the effect of flow rate (at 80° C.) on the mass transfer coefficient. At low flow rates, the overall mass transfer is controlled by diffusion through the boundary layer. Turbulence at high flow rates reduces the boundary layer effects, and at this point k is no longer a function of flow rate. The flattening of the profile was observed for the unmodified membrane but not the CNIM. As the flow rate of feed water was increased from 0.5 to 1.0 mL $min^{-1}$, k in the unmodified membrane increased from $2.78 \times 10^{-6}$ to $5.63 \times 10^{-6}$ m/s, and stayed more or less constant beyond that point. Interestingly, the overall mass transfer coefficient was less affected by the presence of the CNTs at low flow rates and the difference increased with flow rate. At a flow rate of 0.5 mL $min^{-1}$, the mass transfer coefficient of the CNIM was 1.4 times higher than the unmodified membrane, but increased to 2.7 times at 3 mL $min^{-1}$. In general, the presence of the CNTs led to enhanced permeability through the membrane, and mass transfer was not limited by diffusion through the boundary layer even at high flow rates. The mass transfer coefficients as a function of inlet salt concentration at 80° C. and 0.5 ml $min^{-1}$ are presented in FIG. 18. As expected, the values of k decreased with concentration, although they were consistently higher in the presence of CNTs. As compared to the plain membrane, in the salt concentration range of 10 to 10,000 mg $L^{-1}$, the mass transfer coefficients for the CNIM were higher by a factor of 1.4-3.5. At an inlet salt concentration of 34,000 mg $L^{-1}$, the CNIM represented a salt reduction that was higher by a factor of 15. This indicates that even at this extreme concentration, the CNIM selectively allowed the passage of water vapor and minimized salt permeation.

The advantages of CNIM compared to conventional MD include significantly higher flux and salt reduction for a wide range of salt concentrations up to the equivalent of sea water. Another advantage is that the CNIM can facilitate membrane distillation at a relatively lower temperature, higher flow rate and salt concentration. Compared to a plain membrane, the CNIM demonstrated the same level of salt reduction at a 20° C. lower temperature, and at a flow rate that was six times higher. Together these lead to a more efficient process which could potentially make MD economically competitive with existing desalination technologies.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

What is claimed is:

1. A porous membrane for membrane distillation apparatus comprising at least one membrane, said porous membrane comprising nano carbons incorporated into only pores of the membrane.

2. The membrane in accordance with claim 1 wherein at least a portion of the nano carbons comprises carbon nanotubes.

3. The membrane in accordance with claim 1 wherein at least a portion of the nano carbons comprises single or multiwalled carbon nanotubes.

4. The membrane in accordance with claim 1 wherein the membrane is a hollow fiber membrane.

5. The membrane in accordance with claim 1 wherein the membrane is a flat membrane.

6. The membrane in accordance with claim 1 wherein the membrane is a porous, hydrophobic, hollow fiber membrane.

7. A membrane module comprising a housing containing therein at least one membrane according to claim 1, the housing having an inlet for receiving a feed and at least one outlet for discharging permeate.

8. The membrane module according to claim 7 comprising at least one outlet for discharging concentrate.

9. The membrane module according to claim 7 comprising plural membranes.

10. A membrane distillation system comprising a heat exchanger operably connected to a membrane module comprising at least one membrane in accordance with claim 1, and a sample collection element operably connected to an outlet of the membrane module.

11. The membrane distillation system according to claim 10 further comprising a chromatography column for receiving concentrate and optionally a detector for online analysis.

12. The membrane distillation system according to claim 10 wherein the membrane module comprises plural membranes.

13. The membrane distillation system according to claim 10 further comprising a pump for feeding solution to the membrane module.

14. A membrane distillation desalination system comprising a heat exchanger operably connected to a membrane module comprising at least one membrane in accordance with claim 1, the membrane module comprising a vacuum port and a sweep air port.

15. The membrane distillation desalination system according to claim 14 wherein a flow of water, air or vacuum is used on a permeate side.

16. The membrane distillation desalination system according to claim 14 wherein the membrane module comprises plural membranes.

17. The membrane distillation system according to claim 14 further comprising a pump for feeding solution to the membrane module.

18. A membrane distillation desalination system comprising a heat exchanger operably connected to a membrane module comprising at least one membrane in accordance with claim 1, the membrane module operably connected to a water supply to provide a water flow on a permeate side.

19. A membrane distillation system for generating pure water from waste water and preconcentrating waste comprising a heat exchanger operably connected to a membrane module comprising at least one membrane in accordance with claim 1, the membrane module operably connected to a water supply to provide a water flow on a permeate side.

20. A membrane distillation system for recovering solvent from a fluid stream and preconcentrating solutes comprising a membrane module comprising at least one membrane in accordance with claim 1, the membrane module operably connected to a solvent supply to provide a solvent flow on a permeate side.

21. A method of membrane distillation comprising providing at least one membrane according to claim 1, the process comprising feeding a sample solution to a heat exchanger, introducing the sample solution to the at least one membrane comprising the nanocarbons, and filtering the sample solution.

22. A method of preconcentrating a fluid stream employing the steps of claim 21 and further comprising collecting a permeate.

23. The method according to claim 22 of preconcentrating a fluid stream, wherein the fluid stream is a waste stream.

24. The method according to claim 22 further comprising analyzing the concentrate.

25. A method of removing solvent from a solution employing the steps of claim 21.

26. A method of membrane distillation desalination comprising providing at least one membrane according to claim 1, the process comprising feeding a solution to be desalinated to a heat exchanger, introducing the solution to the at least one membrane comprising nano carbons, and filtering the solution.

* * * * *